United States Patent
Lin et al.

(10) Patent No.: US 10,687,035 B2
(45) Date of Patent: Jun. 16, 2020

(54) PROJECTION METHOD AND PROJECTION SYSTEM

(71) Applicant: ASUSTeK COMPUTER INC., Taipei (TW)

(72) Inventors: Yu-Sheng Lin, Taipei (TW); Yaw-Huei Chiou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/572,779

(22) Filed: Sep. 17, 2019

(65) Prior Publication Data
US 2020/0099904 A1 Mar. 26, 2020

(30) Foreign Application Priority Data

Sep. 25, 2018 (TW) .............................. 107133666 A (51) Int. Cl.
*H04N 9/31* (2006.01)
*G06K 9/62* (2006.01)
*G06T 5/50* (2006.01)

(52) U.S. Cl.
CPC ......... *H04N 9/3179* (2013.01); *G06K 9/6202* (2013.01); *G06T 5/50* (2013.01)

(58) Field of Classification Search
CPC ........ H04N 9/3179; H04N 9/31; H04N 9/317; H04N 9/3176; H04N 9/3182; H04N 9/3185; H04N 9/3188; G06T 5/50; G06T 5/006; G06T 5/00; G06K 9/6202

USPC ....... 348/744-747, 806, 807, 578, 580, 581, 348/585, 591, 593
See application file for complete search history.

(56) References Cited

U.S. PATENT DOCUMENTS

| | | | |
|---|---|---|---|
| 2005/0068500 A1 | 3/2005 | Tamura et al. | |
| 2014/0340529 A1* | 11/2014 | Shibata | H04N 9/3194 348/189 |
| 2015/0208052 A1* | 7/2015 | Kobiki | H04N 5/2628 348/578 |
| 2020/0007834 A1* | 1/2020 | Uemura | H04N 9/3185 |

FOREIGN PATENT DOCUMENTS

| | | |
|---|---|---|
| CN | 204929116 U | 12/2015 |
| CN | 105320949 A | 2/2016 |
| CN | 105959659 A | 9/2016 |
| CN | 105959659 A | 9/2016 |
| CN | 106709954 A | 5/2017 |

\* cited by examiner

*Primary Examiner* — Sherrie Hsia
(74) *Attorney, Agent, or Firm* — McClure, Qualey & Rodack, LLP (57) ABSTRACT

A projection method is provided, and includes the following steps: projecting a first image according to an original image; capturing the first image; correcting the first image based on the original image to generate a corrected image; comparing the corrected image with the original image to obtain a difference area; generating a second image according to the original image and the difference area, wherein the second image has a dark region associated with the difference area; and projecting according to the second image.

10 Claims, 8 Drawing Sheets

PROJECTION METHOD AND PROJECTION SYSTEM

CROSS-REFERENCE TO RELATED APPLICATION

This application claims the priority benefit of Taiwan applications serial No. 107133666, filed on Sep. 25, 2018. The entirety of the above-mentioned patent application is hereby incorporated by reference herein and made a part of specification.

BACKGROUND OF THE INVENTION

Field of the Invention

The invention relates to a projection method and a projection system.

Description of the Related Art

With the development of information technology and multimedia technology, users often store a large amount of image data with various electronic devices, and then process those image data with another display device. For an instance, a speaker prepares his/her material for presentation in a notebook computer, and projects the presentation data on a projection screen with a projector in a briefing or a conference.

However, the speaker usually stands between the projector and the projection screen, where the speaker would feel the dazzling light projected by the projector and make the speaker discomfort and even harm his/her eyes.

BRIEF SUMMARY OF THE INVENTION

According to the first aspect of the disclosure, a projection method is provided. The projection method includes the following steps of: projecting a first image according to an original image; capturing the first image; correcting the first image based on the original image to generate a corrected image; comparing the corrected image with the original image to obtain a difference area; generating a second image according to the original image and the difference area, wherein the second image has a dark region associated with the difference area; and projecting according to the second image.

According to the second aspect of the disclosure, a projection system is provided. The projection system includes a projecting unit, an image capturing unit, and a processor. The field of view of the image capturing unit overlays with the field of view of the projecting unit. The processor electrically connected with the image capturing unit and the projecting unit. the projecting unit projects a first image according to an original image, the image capturing unit captures the first image, the processor corrects the first image based on the original image to generate a corrected image, the processor compares the corrected image with the original image to generate a difference area, the processor generates a second image according to the original image and the difference area, the second image has a dark region associated with the difference area, the processor controls the projecting unit to project according to the second image.

In the above embodiments, the difference area of the corrected image that is different from an initial projection is related to the obstacle in front of the projection screen. When the difference area exists, the difference area is detected and the projected content is adjusted, and then the second image with the dark region is projected. Since the dark region represents that the projecting unit does not project light or only projects low-intensity light, the speaker's eyes are not illuminated by glare, which enhances the speaker's comfort.

These and other features, aspects and advantages of the present disclosure will become better understood with regard to the following description, appended claims, and accompanying drawings.

DETAILED DESCRIPTION OF THE EMBODIMENTS

The embodiments of the present disclosure are disclosed in the following drawings. For clarity, the practical details are described in the following description. However, it will be apparent to those skilled in the art that, in some embodiments of the present disclosure, these practical details are not necessary and therefore are not intended to limit the disclosure. In addition, some of the conventional structures and elements are shown in the drawings in a simplified schematic manner in order to simplify the drawings. In addition, the dimensions of the various elements in the drawings are not shown in actual scale for the convenience of the reader.

In this case, when a plurality of components are referred to as "connected" or "coupled", they may be referred to as "electrically connected" or "electrically coupled with", that is, there are electrical signals between these components. In addition, although the terms "first", "second", and the like are used in the present description to describe different elements, the terms are merely used to distinguish elements or operations described in the same technical terms. Unless the context clearly dictates, otherwise, the term is not specifically referred to or implied in order or order, nor is it intended to limit the case.

Figure 1:
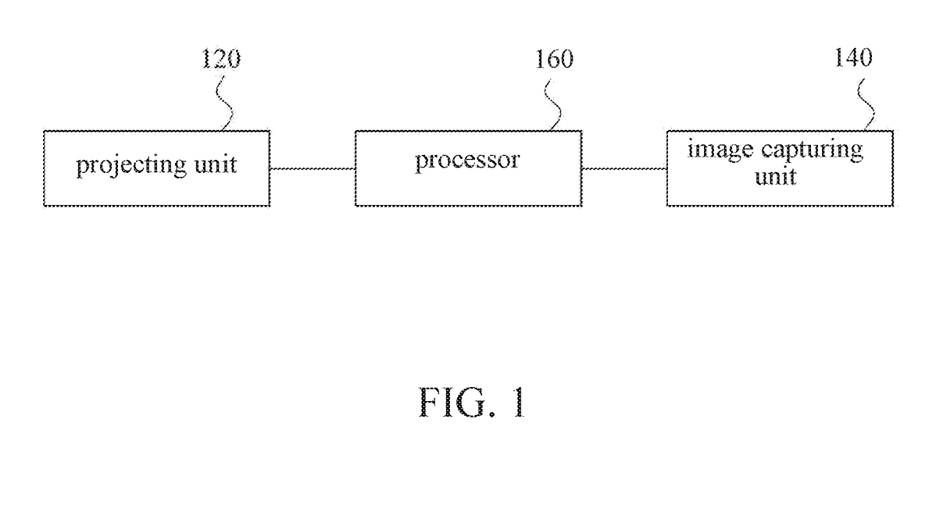
FIG. 1 is a system block diagram of a projection system according to some embodiments of the present disclosure.
Figure 2:
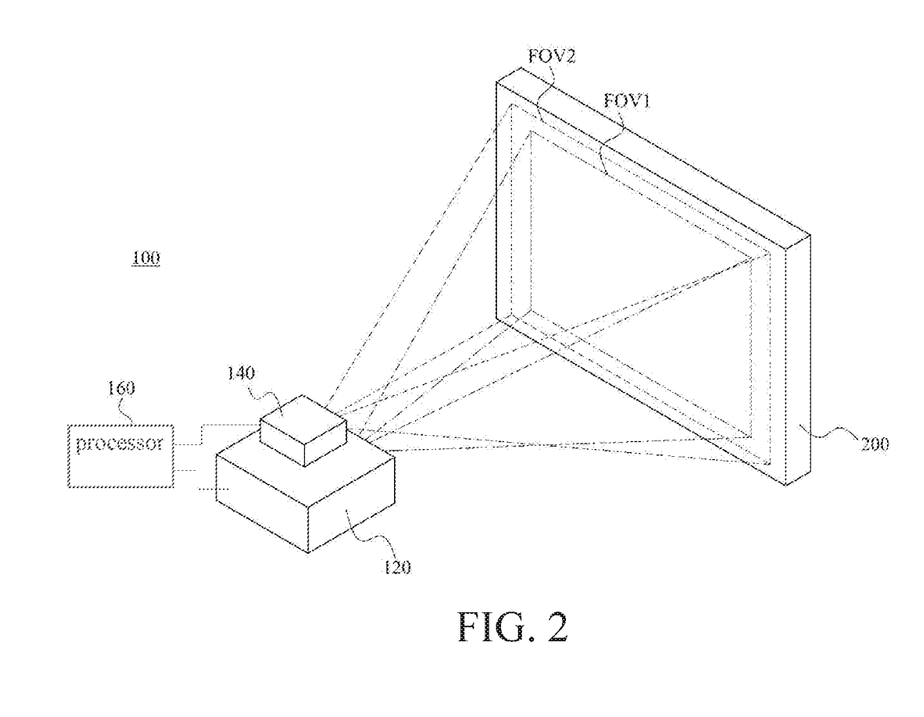
FIG. 2 is a schematic diagram of a configuration of a projection system according to some embodiments of the present invention.

FIG. 1 is a system block diagram of a projection system 100 according to some embodiments of the present disclosure. FIG. 2 is a schematic diagram of a configuration of a projection system 100 according to some embodiments of the present disclosure. As shown in FIG. 1 and FIG. 2, the projection system 100 includes a projecting unit 120, an image capturing unit 140, and a processor 160. The processor 160 is coupled with the image capturing unit 140 and the projecting unit 120 by a wired connection or a wireless connection. In other words, the image capturing unit 140 and the projecting unit 120 exchange signals or data with the processor 160 by wired transmission or wireless transmission. Thereby, the processor 160 receives data or signals from the image capturing unit 140, and also transmits data or signals to the projecting unit 120 to control the projecting unit 120 to project corresponding images.

The image capturing unit 140 is, but not limited to, a photosensitive element such as a charge coupled device (CCD) or a complementary metal oxide semiconductor (CMOS).

As shown in FIG. 2, in an embodiment, the projecting unit 120 projects images to the projection screen 200, and the image capturing unit 140 captures the images projected by the projecting unit 120 on the projection screen 200. Specifically, the projection lens of the projecting unit 120 has a field of view (FOV) FOV1, and the image capturing unit 140 has a field of view FOV2. The field of view FOV2 of the image capturing unit 140 overlays with the field of view FOV1 of the projecting unit 120, so it is determined whether an obstacle (such as a human body) exists in the field of view FOV1 of the projecting unit 120 according to the image captured by the image capturing unit 140. In some embodiments, the field of view FOV1 of the projecting unit 120 is completely included in the field of view FOV2 of the image capturing unit 140 to ensure that the image captured by the image capturing unit 140 includes the overall image projected by the projecting unit 120.

As shown in FIG. 2, in this embodiment, the projection system 100 is a projector including the image capturing unit 140, the projecting unit 120, and the processor 160. The image capturing unit 140 is disposed on the projecting unit 120, which is not limited herein. In other embodiments, the image capturing unit 140 and the projecting unit 120 are two separate electronic devices. For example, the image capturing unit 140 is a camera, a video camera, or an electronic device (such as a mobile phone, tablet, or notebook computer) with image capture components (such as CMOS or CCD). In an embodiment, the projecting unit 120 is a liquid crystal projector (LCD Projector) or a digital light processing projector (DLPTM Projector).

For ease of understanding, the processor 160 is shown outside the projecting unit 120 and the image capturing unit 140. In an embodiment, the processor 160 is disposed in the projecting unit 120 or the image capturing unit 140. In other embodiment, the processor 160 is placed in a computer independent of the projecting unit 120 and the image capturing unit 140. The processor 160 is, but not limited to, a central processing unit (CPU), a graphics processing unit (GPU), a digital signal processor (DSP), and an application specific integrated circuit (ASIC) or other similar components. In some embodiments, the image capturing unit 140 and the processor 160 are integrated into the projecting unit 120.

Figure 3:
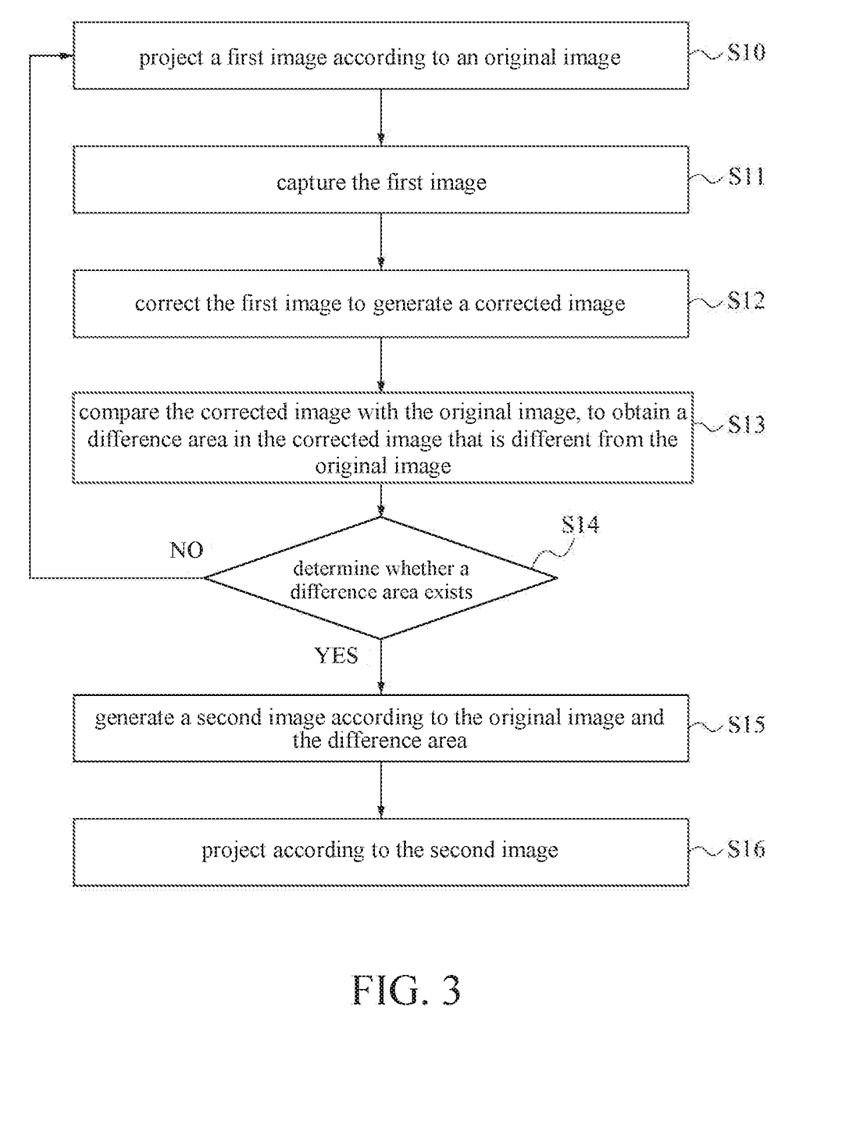
FIG. 3 is a flow chart of a projection method according to some embodiments of the present disclosure.
Figure 6A:
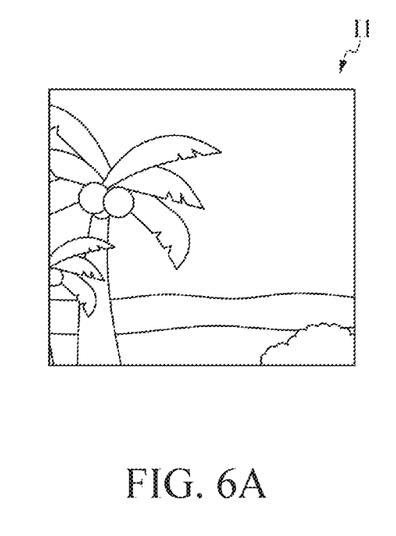
FIG. 6A to FIG. 6D, FIG. 7A to FIG. 7C, and FIG. 8A and FIG. 8B are images generated during execution of the projection method according to some embodiments of the present disclosure.

The following description is in conjunction with the projection system 100 described above to illustrate a projection method according to some embodiments of the present disclosure. FIG. 3 is a flow chart of the projection method according to some embodiments of the present disclosure. In step S10, the projecting unit 120 projects a first image I2 on the projection screen 200 according to an original image I1 (as shown in FIG. 6A).

Figure 6B:
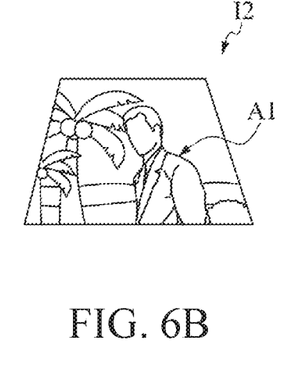

Next, in step S11, the image capturing unit 140 captures the first image I2 (shown in FIG. 6B). In an embodiment, when a particular obstacle (such as, users, a table, a chair, a laptop, etc.) is located in the field of view FOV1 of the projecting unit 120, the light projected by the projecting unit 120 is blocked, and a shadow is generated on the projection screen 200. in an embodiment, when the presenter is standing in front of the projecting unit 120 and is in the field of view FOV1, the first image I2 captured by the image capturing unit 140 includes, a mask area A1. At this time, the image content of the first image I2 may be different from the original image I1 due to having the presenter.

It should be specially noted that since the original image I1 is projected by the projecting unit 120, it also causes a deformation. In an embodiment, when the original image I1 is a square and is projected from a high position to a low position by the projecting unit 120, the first image I2 captured along the horizontal has a trapezoidal shape with a narrow upper width and a wide lower width. In addition, in the projection procession of the projecting unit 120 may also cause image with a certain change in the contrast, brightness or color of the image, such as a decrease in color saturation, a decrease in brightness, or a shift in color temperature of the overall picture.

Figure 6C:
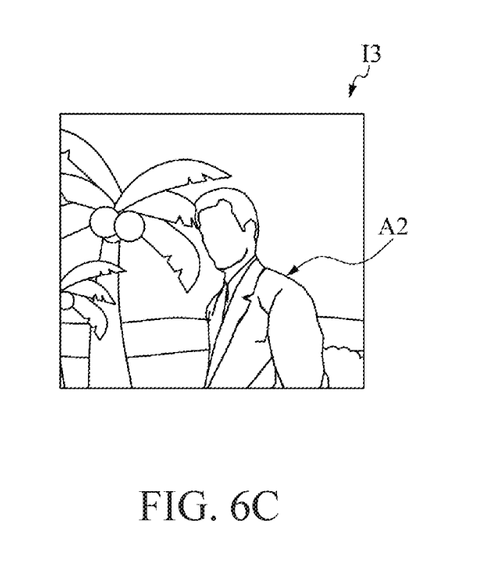

Next, in step S12, the processor 160 corrects the first image I2 based on the original image I1, to generate a corrected image I3 (as shown in FIG. 6C), so that the size, contrast, brightness and color of the corrected image I3 are corrected to be similar to the original image I1 for subsequent image comparison. In particular, step S12 of correcting the first image I2 based on the original image I1 is comprehensively adjusting the overall image characteristics of the first image I2 to eliminate the shape change, color temperature change, brightness change, or dimensional change between the first image I2 and the original image I1 caused by the projection of the projecting unit 120.

Figure 4:
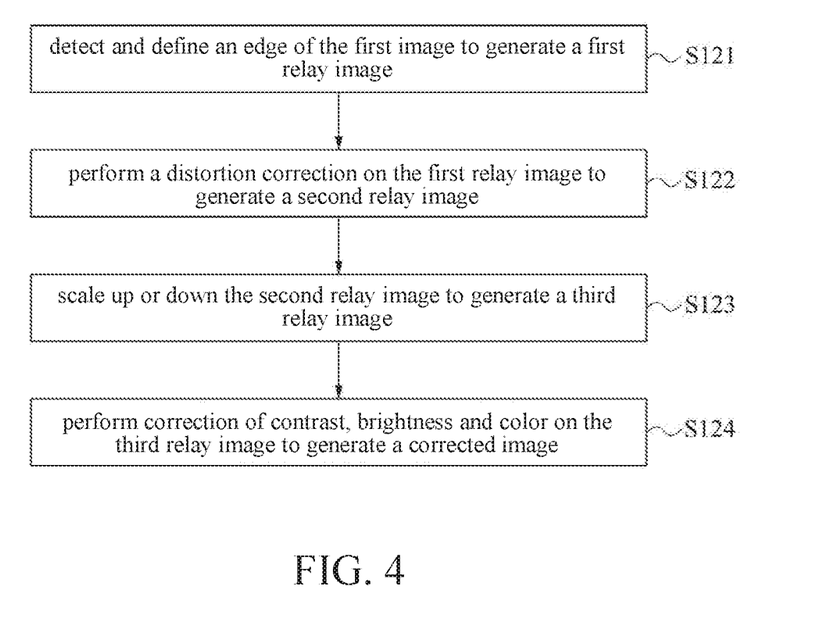
FIG. 4 is a flow chart of an example of step S12 of the projection method shown in FIG. 3.
Figure 7A:
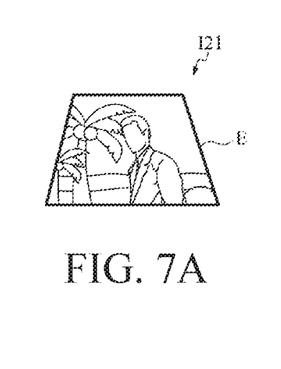
Figure 7B:
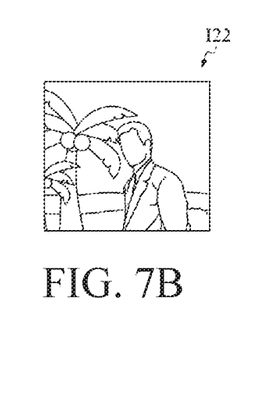

Please also refer to FIG. 4, FIG. 7A, and FIG. 7B, which is a flowchart of the example of step S12. As shown in FIG. 4, in step S121, the processor 160 detects and defines an edge E of the first image I2 to generate a first relay image I21, as shown in FIG. 7A. Next, in step S122, the processor 160 performs a distortion correction on the first relay image I21 to generate a second relay image I22, as shown in FIG. 7B. In one embodiment, the distortion correction includes a keystone correction, such that the deformation of the second relay image I22 relative to the original image I1 is lower than the deformation of the first relay image I21 relative to the original image I1, such as shown in FIG. 7A and FIG. 7B.

Figure 7C:
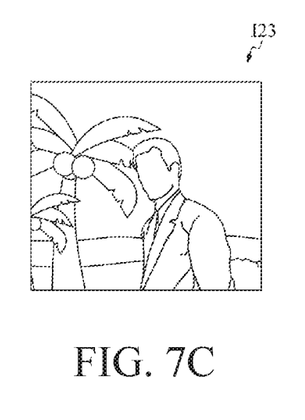

Next, in step S123, the processor 160 scales up or down the second relay image I22 to generate a third relay image I23. The size of the third relay image I23 is different from the size of the second relay image I22, such as shown in FIG. 7C. This scaling is performed based on the original image I1. That is to say, the difference between the size of the third relay image I23 and the size of the original image I1 is smaller than the difference between the size of the second relay image I22 and the size of the original image I1. In one embodiment, the size of the third relay image I23 is substantially the same as the size of the original image I1.

Then, in step S124, the processor 160 corrects at least one of contrast, brightness or color of the third relay image I23 to generate a corrected image I3, and at least one of contrast, brightness or color of the corrected image I3 is different from at least one of contrast, brightness or color of the third relay image I23, as shown in FIG. 6C. The correction of at least one of the above contrast, brightness, and color is performed based on the original image I1. In one embodiment, the contrast difference between the corrected image I3 and the original image I1 is lower than the contrast difference between the third relay image I23 and the original image I1. In one embodiment, the brightness difference between the corrected image I3 and the original image I1 is lower than the brightness difference between the third relay image I23 and the original image I1. In one embodiment, the color difference between the corrected image I3 and the original image I1 is lower than the color difference between the third relay image I23 and the original image I1.

Since the correction of steps S122 to S124 is performed based on the original image I1, the level of distortion, size, contrast, brightness, and color of the corrected image I3 are substantially similar to the level of distortion, size, contrast, brightness, and color of the original image I1. In this way, the processor 160 determines the position, shape and area of a difference area A2 of the corrected image I3 which is different from the original image I1 more accurately. In some embodiments, the image edge detection and definition in step S121, the distortion correction in step S122, the image scaling in step S123, and the correction of contrast, brightness, and color in step S124 is achieved by an algorithm stored in the processor 160.

Through the above steps S121 to S124, the shape change, color temperature change, brightness change or size change of the overall image caused by the projection of the projecting unit 120 is eliminated. In one embodiment, since the presenter is standing in front of the projecting unit 120, and located in the field of view FOV1, the first image I2 captured by the image capturing unit 140 includes the mask area A1 and the corrected image I3 also includes a difference area A2.

Please return to FIG. 3, in step S13, the processor 160 compares the corrected image I3 with the original image I1, thereby finding out the difference area A2 in the corrected image I3 that is different from the original image I1.

After the aforementioned correction step, the positions of all first pixels of the corrected image I3 correspond to the positions of all second pixels of the original image I1. In an embodiment, the step of comparing the corrected image I3 with the original image I1 to obtain the difference area A2 (step S12) further comprises: compare the pixel (that is, the first pixel) in the corrected image I3 with the pixel (that is, the second pixel) in the original image I1 corresponding to the position of the first pixel to generate a comparison result. When the comparison result is that the difference between the first pixel of the corrected image of I3 and the second pixel of the original image I1 corresponding to the position of the first pixel is greater than a threshold value, it is determined that the first pixel belongs to the difference area A2.

In another embodiment, the step of comparing the corrected image with the original image to obtain the difference area A2 (step S13) further comprises: compare a first pixel block composed of a plurality of adjacent first pixels in the corrected image I3 with a second pixel block composed a plurality of adjacent second pixels in the original image I1 and corresponding to the first pixel block to generate a comparison result. When the comparison result is that the difference between the first pixel block of the corrected image I3 and the second pixel block of the original image I1 corresponding to the first pixel block is greater than a threshold value, it is determined that the first pixel block belongs to a portion of the difference area A2. In an embodiment, the second pixel block in the original image I1 is corresponding to the first pixel block in the corrected image I3 that means the position of the second pixel block in the original image I1 is corresponding to the position of the first pixel block in the corrected image I3 in an embodiment, the threshold value is set to a particular unit size of the luminance grayscale value or a particular unit size of the color grayscale value. For example, when the luminance grayscale value or the color grayscale value is 0~255 and is divided into 256 units, when the pixel color difference between the first pixel and the corresponding second pixel is more than 5 units of the luminance grayscale value or the color grayscale value, it is determined that the first pixel belongs to a portion of the difference area A2. When the pixel color difference is less than 5 units (the threshold difference is 5 units), it may be the image capture or correction error, which is the acceptable tolerance. The 5 units of the luminance grayscale value or the color grayscale value is only an example, and the appropriate threshold difference is set according to actual needs, and is not limited to 5 units.

In an embodiment, in step S14, the processor 160 determines whether a difference exists between the corrected image I3 and the original image I1.

In step S14, when the processor 160 determines no difference exists between the corrected image I3 and the original image I1, the corrected image (not shown) is substantially the same as the original image I1, which means no obstacle exists in front of the projecting unit 120 at this time, and then the processor 160 comes back to execute step S10. In step S10, the projecting unit 120 continues to project according to the original image I1.

Figure 6D:
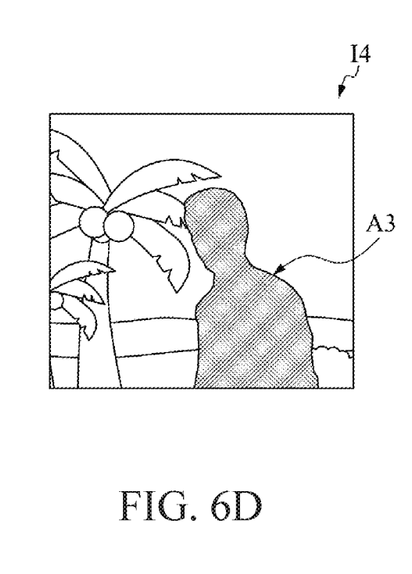

In another case of step S14, when it is determined that a difference area A2 exists between the corrected image I3 and the original image I1, it probably means that an obstacle is located on the projection path of the projecting unit 100. At this time, the processor 160 executes step S15 to generate a second image I4 with a dark region A3 as shown in FIG. 6D. The dark region A3 is related to the difference area A2 in the corrected image I3. For example, as shown in FIG. 6C and FIG. 6D, the position, contour, and size of the dark region A3 of the second image I4 are substantially the same as the position, contour, and size of the difference area A2 of the corrected image I3. That is, the position, contour, and size of the dark region A3 correspond to the shadow created by the human body (such as a presenter) on the projection screen 200. Thereby, when the projecting unit 100 projects according to the second image I4 in step S16, since the dark region A3 only projected by no light or low-intensity light, the speaker is not illuminated by strong light, which reduces the discomfort caused by the glare from the projecting unit 120.

Figure 5:
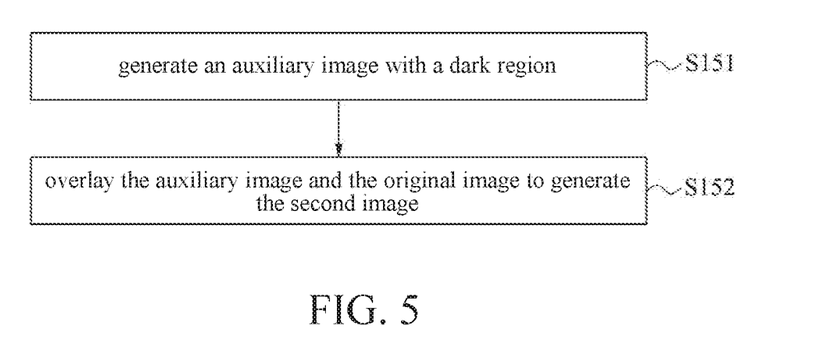
FIG. 5 is a flow chart of an example of step S15 of the projection method shown in FIG. 3.
Figure 8A:
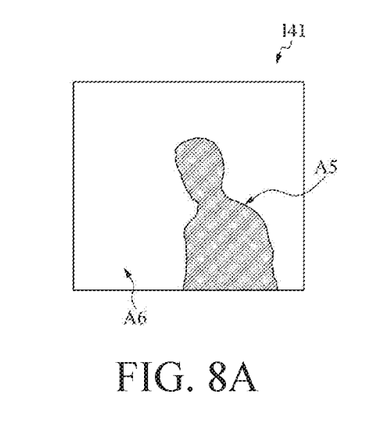

Refer to FIG. 5, which is an example flow chart of step S15. As shown in FIG. 5, in step S151, the processor 160 generates an auxiliary image I41 as shown in FIG. 8A. The auxiliary image I41 has a dark region A5, and all the regions A6 except the dark region A5 in the auxiliary image I41 are transparent. The generating method of the auxiliary image I41 comprises: setting the pixel value of each coordinate point of the computer vision matrix corresponding to the area A5 to a pixel value of a dark color (for example, black or brown), and setting the color value of each coordinate point of the computer vision matrix corresponding to the regions A6 except the dark region A5 to a pixel value of the transparency (for example, 0). It can be understood that the above generating method of the auxiliary image I41 is just for the readers to understand, and is not intended to limit the scope of the embodiment of the disclosure.

Figure 8B:
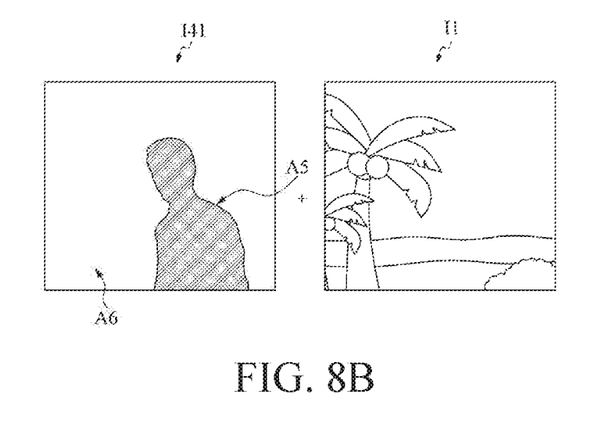

Next, in step S152, the processor 160 superimposes the auxiliary image I41 and the original image I1 (as shown in FIG. 8B), thereby generating the second image I4 (shown in FIG. 6D). Since the dark region A5 of the auxiliary image I41 changes the color of the corresponding region in the original image I1 to a dark color, the dark region A3 is generated in the second image I4. Furthermore, since the auxiliary image I41 has the transparent area A6, even if the auxiliary image I41 is superimposed on the original image I1, the color of the corresponding area in the original image I1 is not changed. Therefore, the image content of the other regions except the dark region A3 in the second image I4 is substantially the same as the original image I1. In some embodiments, the generating method of the auxiliary image of step S151 and the image superimposing of step S152 is implemented by an algorithm in the processor 160 in an embodiment.

In the embodiment, the shape and size of the dark region A5 in the second image I4 and the difference area A2 in the corrected image I3 are substantially the same. In other embodiments, at least one of the shape or size of the dark region A5 in the second image I4 may be different from the difference area A2 of the corrected image I3 as long as the presenter is prevented from being illuminated by the strong light of the projecting unit 120. In one embodiment, the shape and size of the dark region A5 is the same as the shape and size of the difference area A2. In another embodiment, the dark region A5 is slightly larger than the difference area A2 to completely cover the difference area A2. In an embodiment, the dark region A5 is the circular area, a rectangular area, or an area having other geometric shapes.

Through the above embodiment, when a person or other obstacles is located on the projection path of the projecting unit, the projection and the projection method of the disclosure automatically detect and generate images with dark region, avoiding strong projection light shining person or other obstacles. When there is no person or other obstacle, the full image content is resumed to display.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A projection method, comprising:
   projecting a first image according to an original image;
   capturing the first image;
   correcting the first image based on the original image to generate a corrected image;
   comparing the corrected image with the original image to obtain a difference area;
   generating a second image according to the original image and the difference area, wherein the second image has a dark region associated with the difference area; and
   projecting according to the second image.

2. The projection method according to claim 1, wherein the step of generating the second image comprises:
   generating an auxiliary image with the dark region; and
   superimposing the auxiliary image and the original image to generate the second image.

3. The projection method according to claim 2, wherein all the regions except the dark region in the auxiliary image are transparent.

4. The projection method according to claim 1, wherein the step of correcting the first image includes correcting the distortion level, size, contrast, brightness, and color of the first image.

5. The projection method according to claim 1, wherein the position of a plurality of pixels in the corrected image corresponds to the position of a plurality of pixels in the original image, and the step of comparing the corrected image with the original image to obtain the difference area comprises:
   comparing a first pixel in the corrected image or a first pixel block composed of a plurality of adjacent first pixels in the corrected image with a second pixel in the original image or a second pixel block composed of a plurality of adjacent second pixels in the original image corresponding to the first pixel or the first pixel block to generate a comparison result;
   when the comparison result is that a difference between the first pixel in the corrected image and the second pixel in the original image is greater than a threshold value or the difference between the first pixel block in the corrected image and the second pixel block in the original image is greater than the threshold value, determining that the first pixel or the first pixel block belongs to a portion of the difference area.

6. A projection system, includes:
   a projecting unit;
   an image capturing unit, a field of view of the image capturing unit overlays with a field of view of the projecting unit; and
   a processor, electrically connected with the image capturing unit and the projecting unit,
   wherein the projecting unit projects a first image according to an original image, the image capturing unit captures the first image, the processor corrects the first image based on the original image to generate a corrected image, the processor compares the corrected image with the original image to obtain a difference area, the processor generates a second image according to the original image and the difference area, the second image has a dark region associated with the difference area, the processor controls the projecting unit to project according to the second image.

7. The projection system according to claim 6, wherein the step of generating the second image comprises:
   the processor generates an auxiliary image with the dark region; and
   the processor superimposes the auxiliary image and the original image to generate the second image.

8. The projection system according to claim 7, wherein all the regions except the dark region in the auxiliary image are transparent.

9. The projection system according to claim 6, wherein the processor corrects the distortion level, size, contrast, brightness, and color.

10. The projection system according to claim 6, wherein the position of a plurality of pixels in the corrected image corresponds to the position of a plurality of pixels in the original image, and the processor compares a first pixel in the corrected image or a first pixel block composed of a plurality of adjacent first pixels in the corrected image with a second pixel in the original image or a second pixel block composed of a plurality of adjacent second pixels in the original image corresponding to the first pixel or the first pixel block to generate a comparison result, when a comparison result is that the difference between the first pixel in the corrected image and the second pixel in the original image is greater than a threshold value or the difference between the first pixel block in the corrected image and the second pixel block in the original image is greater than the threshold value, it is determined that the first pixel or the first pixel block belongs to a portion of the difference area.

* * * * *